Figure 1:
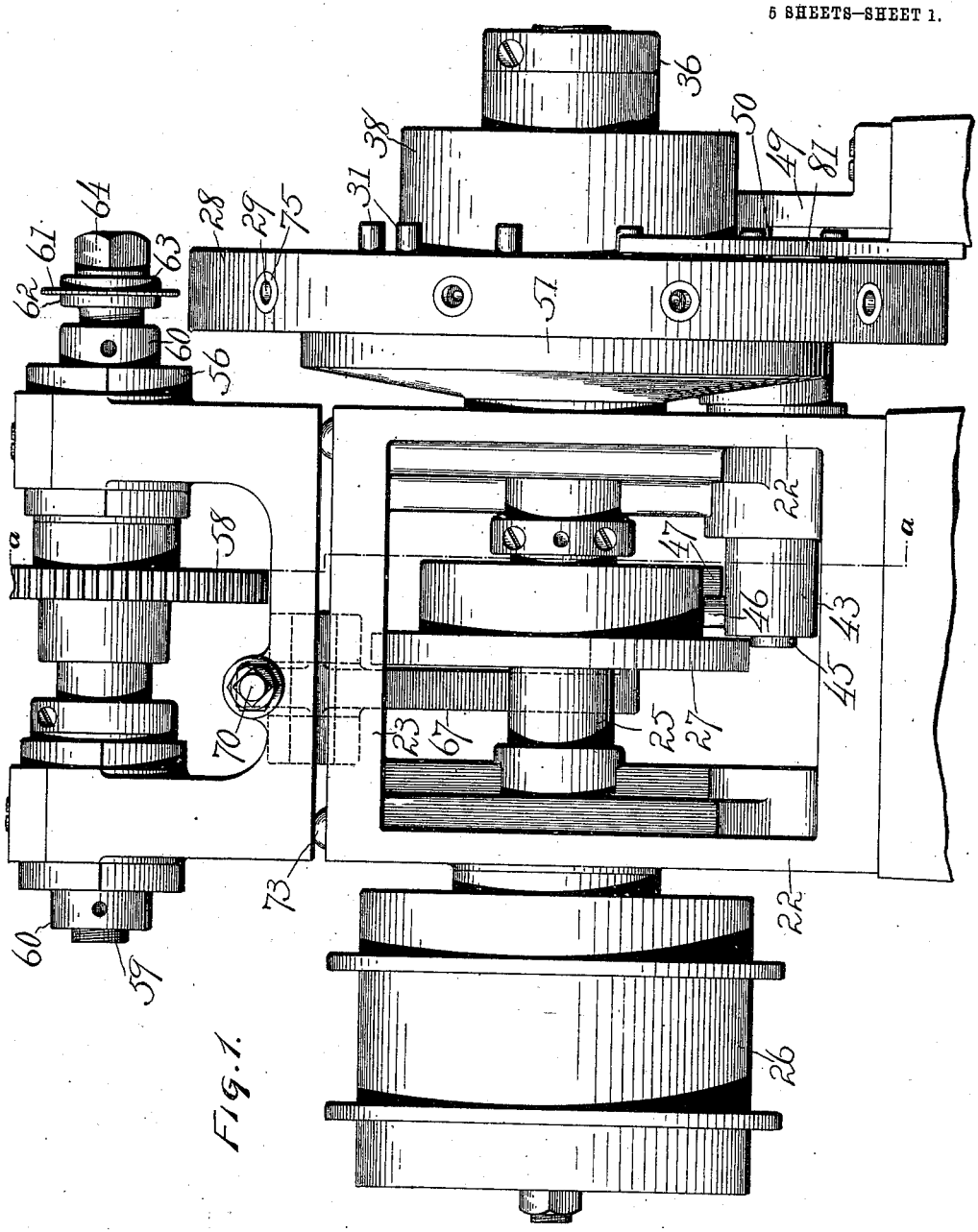

G. E. WITHERELL & E. R. SEWARD.
SCREW SLOTTING MACHINE.
APPLICATION FILED DEC. 18, 1906.

996,188.

Patented June 27, 1911.
5 SHEETS—SHEET 1.

WITNESSES:
S. S. Grotta.
L. E. Berkovitch.

INVENTORS
George E. Witherell
PER Ernest R. Seward
Arthur B. Jenkins.
ATTORNEY.

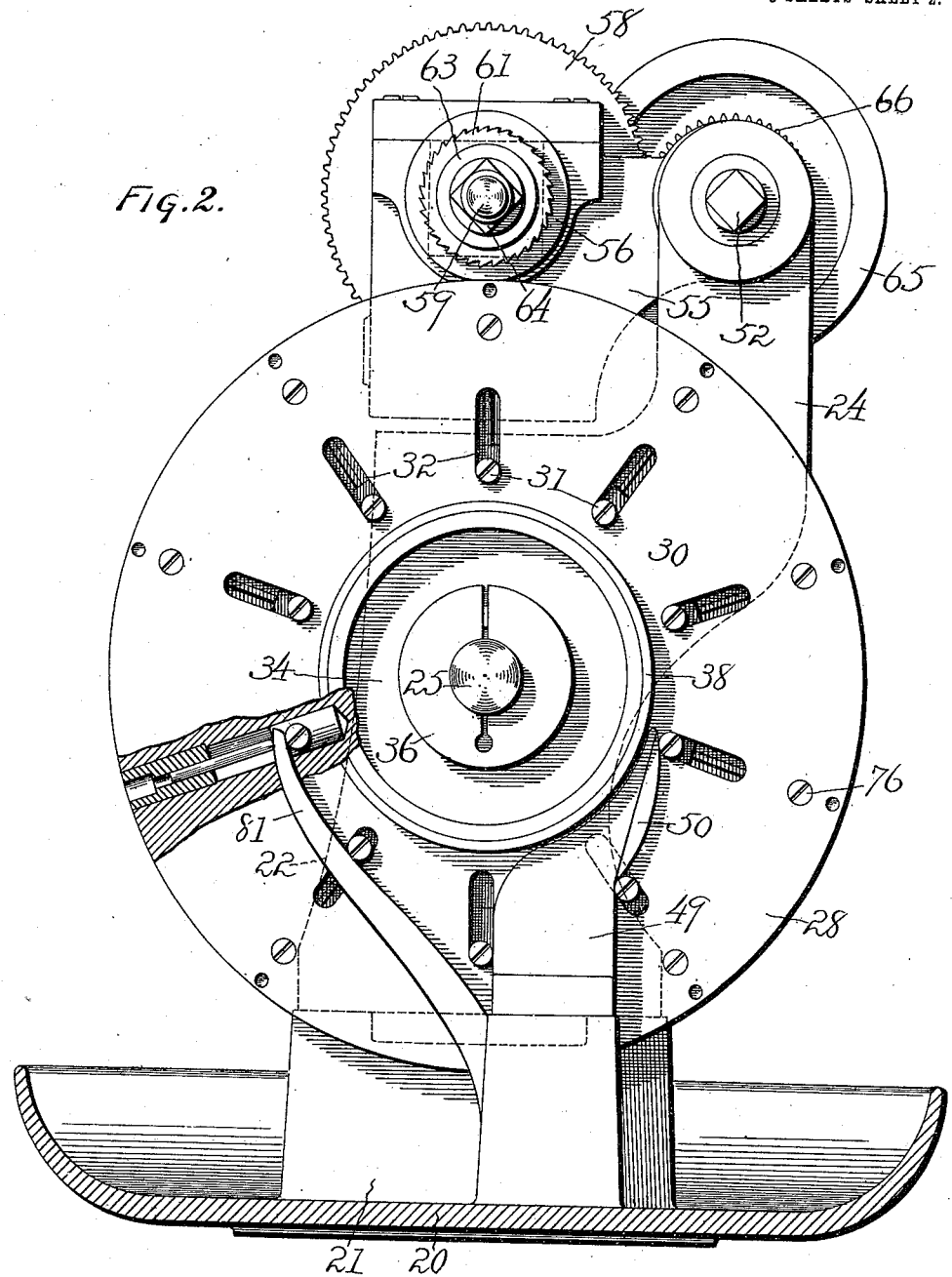

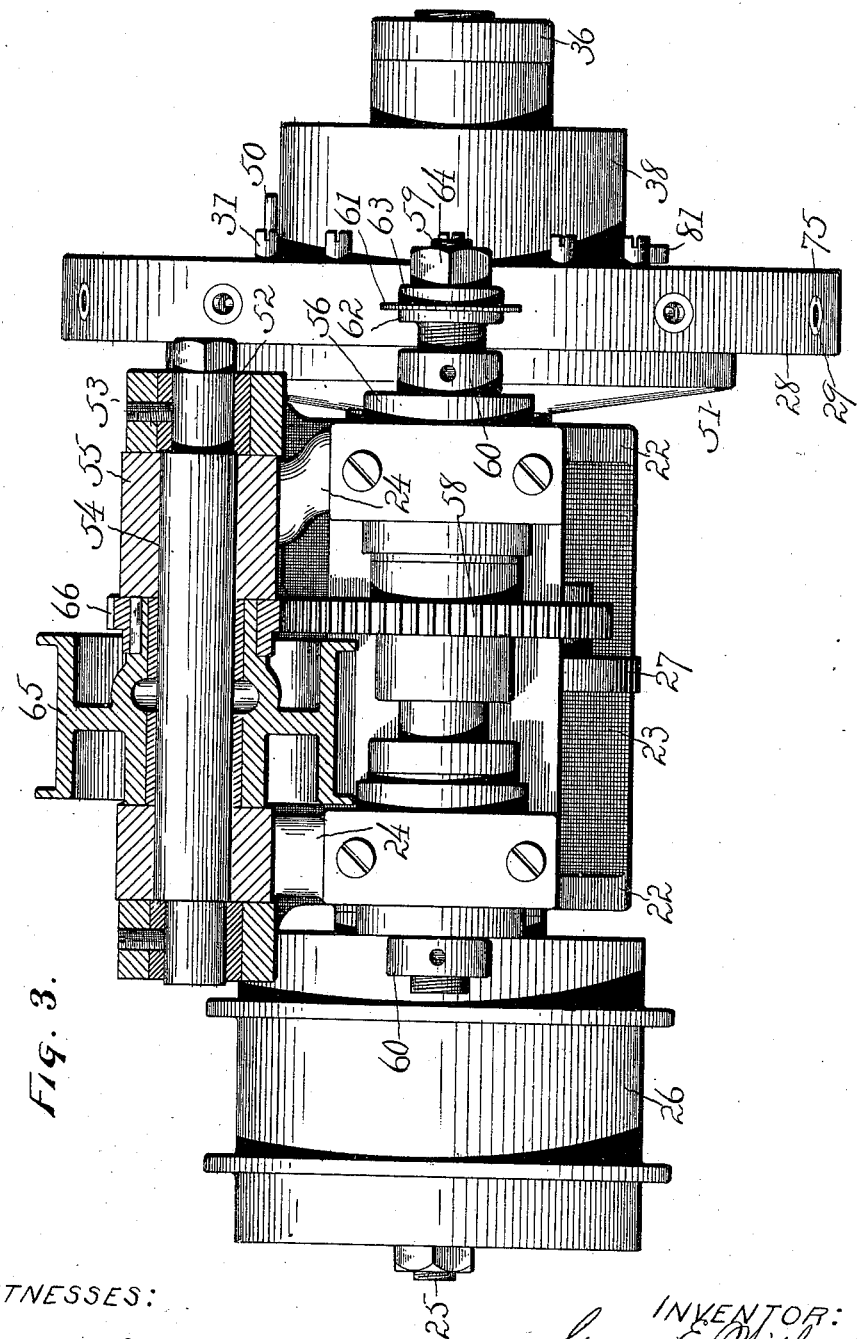

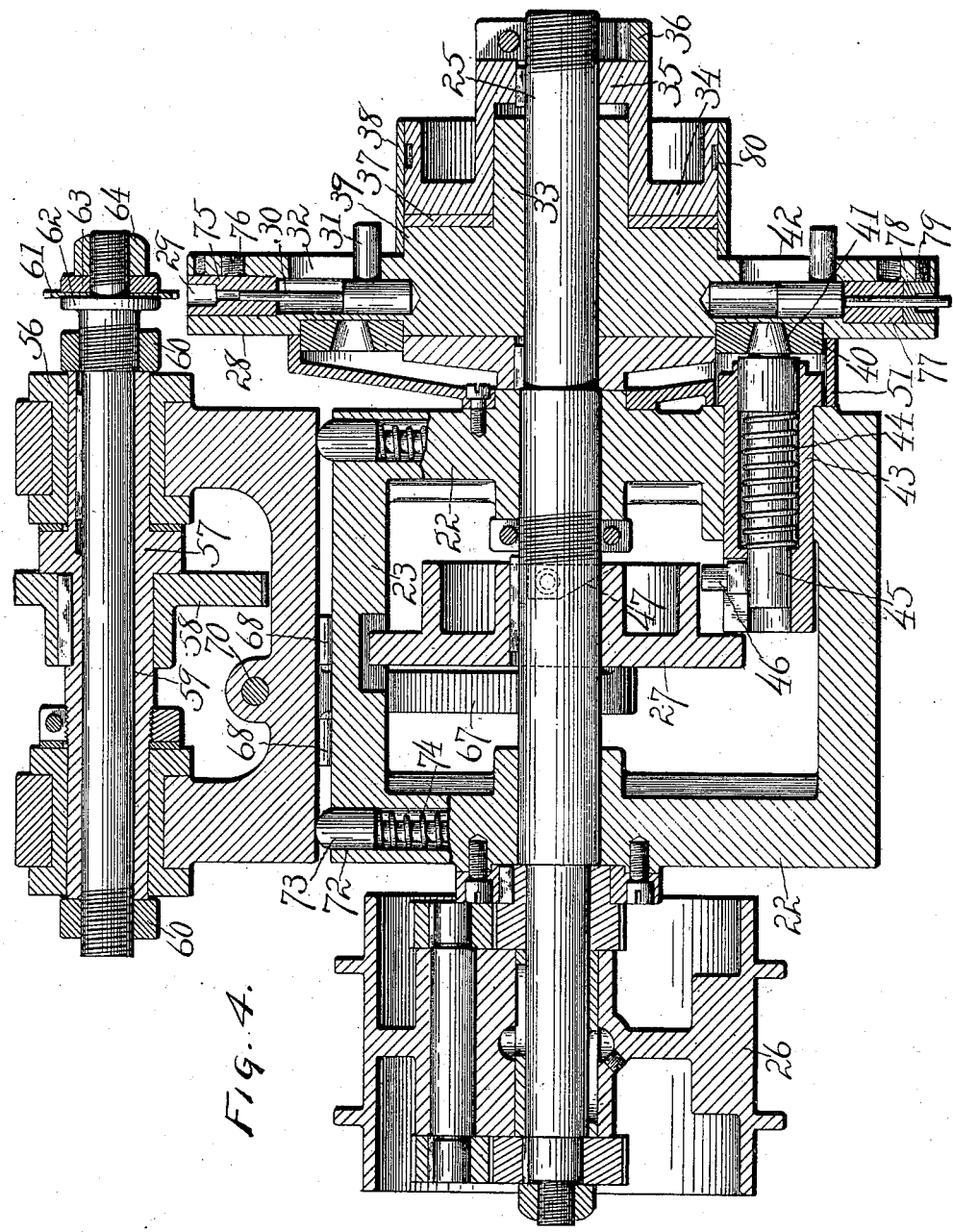

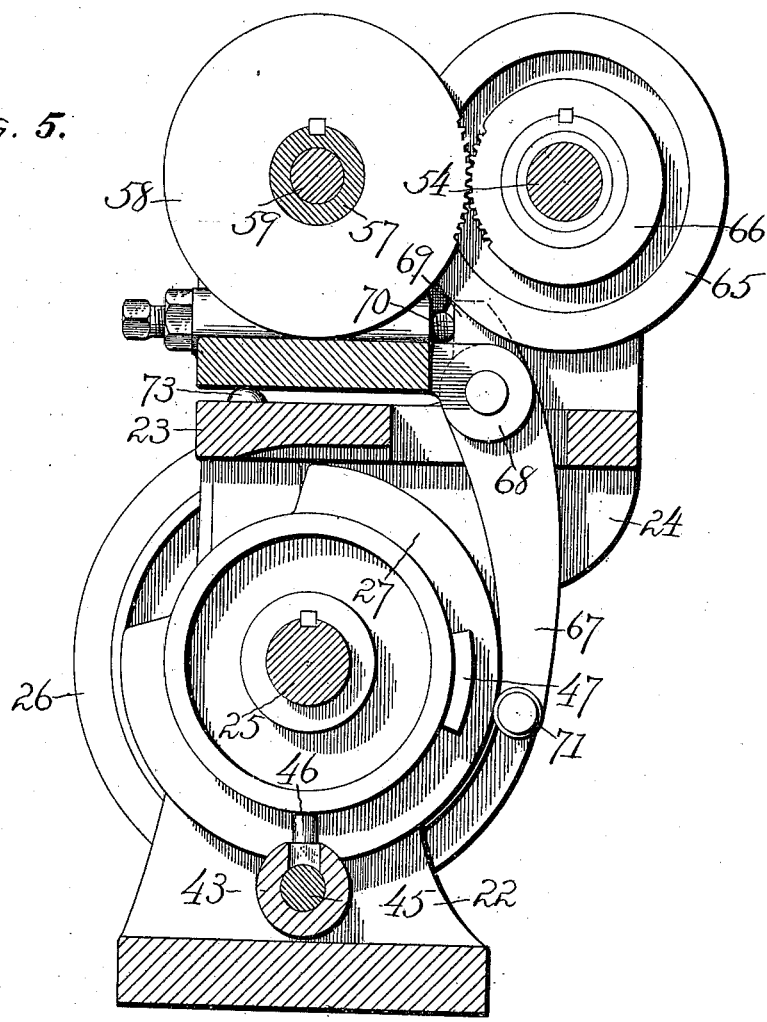

UNITED STATES PATENT OFFICE.

GEORGE E. WITHERELL AND ERNEST R. SEWARD, OF HARTFORD, CONNECTICUT, ASSIGNORS TO THE HARTFORD MACHINE SCREW COMPANY, OF HARTFORD, CONNECTICUT, A CORPORATION OF CONNECTICUT.

SCREW-SLOTTING MACHINE.

996,188.        Specification of Letters Patent.    Patented June 27, 1911.

Application filed December 18, 1906. Serial No. 348,409.

*To all whom it may concern:*

Be it known that we, GEORGE E. WITHERELL and ERNEST R. SEWARD, each a citizen of the United States and each a resident of Hartford, in the county of Hartford and State of Connecticut, have invented a new and Improved Screw-Slotting Machine, of which the following is a specification.

This invention relates to the class of machines used for slotting the heads of screws, more especially of the smaller dimensions, and the object of the invention is to provide a machine of this class that shall be particularly accurate and efficient in its operation, and one in which the slot shall be of proper shape to effectively receive a screw driver or like tool; and a further object of the invention is to provide a machine that shall be extremely rapid in its operation; and a further object is to provide a machine that shall be extremely simple in its construction and in its operation. A form of machine in the use of which these objects together with others may be attained is illustrated in the accompanying drawings, in which—

Figure 1 is a view in front elevation of a machine embodying the invention with parts in the rear omitted. Fig. 2 is a view in end elevation of the machine with parts broken away to show construction. Fig. 3 is a top or plan view of the same, the head stock bearing being shown in section lengthwise through its axis. Fig. 4 is a detail view in vertical lengthwise section passing through the axis of the saw-arbor and cam shaft, a part of the section, however, passing through the sockets containing the yielding head stock supports with parts in the rear omitted. Fig. 5 is a detail view in crosswise vertical section on the line *a*—*a* of Fig. 1.

In the accompanying drawings the numeral 20 denotes the pan which supports the machine as a whole, this pan being of ordinary form and construction, common to devices of this class for receiving the oil and chips from the machine and provided with ordinary means for securing it to a base or support. A frame rests upon the base 21 and includes end pieces 22, a cross bar 23 and an offset portion including two arms 24 forming saw head stock supports. These supports are located preferably at opposite ends of the frame.

A main shaft 25 is supported in bearings in the end pieces 22, this shaft projecting beyond said end pieces. On one end a driving pulley 26 is supported, and, preferably located between the end pieces, a head stock operating cam 27 is also secured to this shaft. The shaft bears, preferably outside of the end pieces 22, a screw holding disk or carrier 28. This disk has at intervals about its periphery and preferably radially formed therein, work receiving recesses 29, and opening thereout of at the bottom ejector sockets in each of which an ejector 30 is located. An ejector pin 31 secured to the shank of each ejector projects through a slot 32 in the side of the carrier. This carrier is so mounted on the shaft that rotative movement of one of said parts independently of the other is permitted. In the form shown a hub 33 projects centrally from the side of the carrier and a friction disk 34 is partially mounted on this hub and has an internal flange 35 in engagement with and keyed to the shaft 25. A clamp nut 36 secured on the screw threaded end of the shaft serves to hold the friction disk in place, and also to regulate the amount of friction between a shoe 37, located between the facing surfaces of the disk and carrier and said disk and carrier. An oil excluder consisting of a sleeve 38 fits upon the periphery of the friction disk, its end projecting beyond the shoe and on to a shoulder formed by an enlargement 39 on the hub of the carrier. This shell closely fits the friction disk and also said enlargement, the former, however, being permitted, under the application of proper force, to turn within the excluder. The shoe 37 is thus protected from oil used in the operation of the machine. A recess is formed in the opposite side of the carrier in which an index ring 40 is located, this index ring being provided at suitable intervals corresponding to the work receiving recesses, with bolt sockets 41 for the reception of the indexing bolt head 42. This indexing bolt head is mounted in a bushing 43 secured in one of the end pieces 22, this bushing being chambered to receive a spring 44 thrusting with one end against the bottom of the chamber and with the other against a shoulder formed between the head 42 and the shank 45 of the indexing bolt. A bolt actuating lug 46 projects from the side of the shank 45 in position to be struck by a cam or cams 47 on a flange of the head stock operating cam 27. The periphery of this cam is suitably formed to actuate a saw head stock to be hereinafter described.

The ejector pins 31 are located in position to engage a cam bracket 49 secured to a stationary part of the machine as herein shown, this bracket projecting upward from the base or pan of the machine, or a lug located therein. A cam 50 is secured to this bracket, and is properly formed and positioned to timely actuate the ejector.

An index shield 51 is secured to the frame of the machine and lies with its edge against the side of the carrier 28, thus protecting the index ring 40 from chips and dirt which accumulate in the operation of the machine.

The saw head stock supports each has an opening in which one end of an eccentric pin 52 is located. This pin may be rotatably adjusted in its bearings and clamped in place as by means of screws 53 and the eccentric portion 54 forms a bearing for a head stock or tool support. This head stock has supporting arms 55 mounted upon the eccentric portion of the pin and saw spindle bearings 56, located near the front of the head stock. These bearings are suitably formed and a saw spindle 57 is mounted in these bearings. This saw spindle is tubular, and has a saw driving gear 58 secured thereto by means of which the saw is driven. A saw-arbor 59 extends through the saw spindle projecting at opposite ends. This arbor is splined within the spindle and adjusting nuts 60 are secured to threaded portions of the arbor, so located that the nuts press against the ends of the spindle. The spindle bearings are so constructed that these nuts do not interfere with the free rotation of the spindle, the nuts, however, being preferably located quite close to the bearings. A saw 61 is secured in any desired manner to the arbor. In the preferred form of construction a flange 62 is formed on the arbor against the face of which the saw 61 rests, and a washer 63 of fibrous material lies against the opposite side of the saw and is held in place by a clamp nut 64. A saw driving pulley 65 is mounted upon the eccentric pin 52, and a gear 66, integral with or secured to said pulley, meshes with the saw driving gear 58.

An actuating lever 67 is pivoted between ears 68 projecting from the lower rear portion of the head stock. A nose 69 on the upper end of this lever is located to receive the thrust of an adjusting pin 70 located in a socket extending across the base of the head stock. The lower end of this lever is provided with a suitable stud and cam roll 71 which is acted upon by the head stock operating cam 27. Spring plunger sockets 72 extend depthwise of the end pieces 22 near the front side thereof, and spring plungers or head stock supports 73 are located in these sockets near the opposite front ends of the head stock. Springs 74 surrounding the shanks of these spring plungers and thrusting with one end against the bottom of the socket and with the other end against the shoulder formed between the head and shank of the spring plungers hold the latter normally at the outer limit of their play. The head stock at its front edge rests upon these spring plungers that normally hold said stock at the upper limit of its play.

It will be noted from this construction that the saw can be readily adjusted in three directions. By means of the adjusting nuts located on the saw arbor the saw may be adjusted lengthwise of the machine, or in the direction of the axis of the arbor. By means of the eccentric mount for the head stock the saw may be adjusted in a direction crosswise of the machine, that is, from front to rear or vice-versa, and by means of the adjusting screw or pin 70 the depth of the cut, or cutting movement of the saw, is regulated, which in effect is an adjustment depthwise of the machine. The screws are manually fed to the carrier that successively places them in position underneath the saw which is projected downward endwise of the screw, cutting into the latter lengthwise thereof. As the carrier rotates carrying the screws away from the saw the former will easily fall from their sockets, but in case they shall not do so the ejector mechanism insures their removal.

The indexing bolt is timely withdrawn from the sockets in the index ring. As soon as the carrier is thus unlocked the frictional engagement between the driving shaft and carrier rapidly rotates the latter and the bolt being relieved from its cam immediately, under the action of its spring, is forced with its end against the side of the carrier. As soon as the next socket is located opposite the bolt the latter is forced into it, locking the carrier against movement until the indexing bolt is again withdrawn. This frictional connection between the carrier and the cam shaft enables the latter to be driven at a comparatively rapid rate of speed at the time of release of the index bolt, so that the carrier may instantly take up this speed of the cam shaft. This avoids the use of mechanism for increasing the speed of the cam shaft at such time and which could not practically be timed to a nicety to increase the speed immediately on withdrawal of the index bolt, and reduce the speed just before engagement of the bolt.

In the form of device herein shown the recesses 29 are formed in bushings 75 which are held as by adjusting screws 76. This construction provides for the reception of comparatively large screws, but when screws of extremely small dimensions are operated upon a filling piece 77 (shown at the bottom of the disk in Fig. 4 of the drawings) is employed and a short bushing 78 held in place by a set screw 79 is employed to receive the screws.

A groove 80 is formed in the periphery of the friction disk 34 and prevents the entrance of oil between the sleeve and disk at the outer end and consequent access to the shoe 37.

A cam 81 secured to a stationary part of the base or frame projects upward into the path of movement of the pins 31, this cam being formed to move the ejectors to the inward limit of their play and into such position as not to obstruct the placing of a screw in its socket.

The location of the driving pulley at the axis of the head stock and the intermeshing gears on said axis and on the saw spindle provides for a ready and convenient means of driving the saw from a source of power independent of that employed to rotate the driving shaft.

What we claim as our invention and desire to secure by Letters Patent is:—

1. In a tooling machine, a driving member, a friction disk secured to the driving member and having a recessed hub, a driven member mounted to rotate on the driving member and having a hub fitting the recess in said friction disk, a friction shoe interposed between the friction disk and driven member, means for holding the driven member against rotation, and means for releasing said holding means.

2. In a tooling machine, a driving member, a driven member loosely mounted thereon, a friction disk secured to the driving member, a friction shoe interposed between the friction disk and driven member, locking mechanism mounted to hold the driven member against movement and means mounted upon the driving member for operating said locking mechanism.

3. In a tooling machine, a driving shaft, a friction disk secured to the driving shaft, a carrier loosely mounted upon the driving shaft, a friction shoe interposed between the carrier and friction disk, an index ring secured to the carrier and having recesses, an indexing bolt mounted to engage said recesses and a cam secured to said shaft in position to actuate said indexing bolt.

4. A driving member, a driven member mounted and arranged to be held against rotation thereon, means for holding the driven member against movement, means for releasing the holding means, a hub on the driven member, a shoulder on the driven member, a driving disk mounted on said hub and secured to rotate with the shaft, a friction shoe interposed between the friction disk and driven member, a sleeve surrounding the friction disk and engaging the shoulder on the driven member, and a tool to operate upon work held in the driven member.

5. A shaft with means for rotating it, a member loosely mounted upon the shaft, a friction disk secured to the shaft, a shoe interposed between the disk and said member, a protecting sleeve inclosing said shoe, a peripheral groove inclosed by said sleeve to prevent flow of oil to the shoe, a device for intermittently holding said member against rotation, means for releasing said holding device, and means to coöperate with said member in its periods of rest.

6. A shaft with means for rotating it, a member loosely mounted on the shaft and having a hub extending from one face, a friction disk secured to the shaft and having a recess receiving said hub upon which said disk is partially mounted, a shoe interposed between the disk and said member, a protecting sleeve inclosing said shoe, a device for intermittently holding said member against rotation, means for releasing said holding device, and means to coöperate with said member in its periods of rest.

7. A work holder, a head stock movably mounted with respect to said holder, means for operating the head stock, a slotting saw mounted in the head stock, means for adjusting the position of the saw in a plane at an angle to the plane of the carrier, and means for adjusting the position of the saw to vary its degree of movement in a direction toward and from the carrier.

8. A carrier having work receiving means, means for operating the carrier, a head stock mounted in coöperative relation with the carrier, a hollow spindle mounted in the head stock, a saw arbor splined to said spindle, means for rotating the arbor, a saw secured to the arbor, and means for rotating the head stock.

9. A carrier having work receiving means, means for operating the carrier, a head stock mounted in coöperative relation with the carrier, a hollow spindle mounted in the head stock, a saw arbor adjustable lengthwise within said spindle and splined thereto, a saw secured to the arbor, means for rotating the spindle, and means for operating the head stock.

10. A mount for a machine tool including a support, a hollow spindle mounted in the support and held against lengthwise movement therein, a tool supporting arbor splined within said spindle, a tool secured to the arbor, means for adjusting the arbor within said spindle, means for holding the arbor and spindle against lengthwise movement in their bearings and also one with respect to the other, and means for rotating the spindle.

11. A support for a machine tool, a hollow spindle mounted in bearings on the support with the ends of the spindle flush with the outer sides of the bearings, a tool holding arbor splined within the spindle, adjusting nuts fitting threaded portions of the arbor and clamped against opposite ends of the spindle, said nuts projecting beyond the periphery of the spindle, a tool secured to the arbor, and means for rotating the spindle.

12. A support for a tool, a tool mounted in the support, a support operating lever, a pivot connecting said lever to said support, an adjusting pin to receive the thrust of the lever, means for operating the lever, and means for operatively supporting work with respect to said tool.

13. A support for a pulley, a pulley mounted in the support, a support operating lever pivotally mounted on said support, a pin adjustably mounted on the support to receive the thrust of the lever on one side of the pivot, and means acting upon the lever on the opposite side of the pivot to actuate said lever and support.

14. A support for a tool, the tool mounted on the support, a lever pivotally mounted on the support, means operating upon the lever to operate the support, and a pin adjustably mounted on the support to engage said lever and oppose the thrust of the support operating means.

15. A support for a tool, the tool mounted on the support, a lever pivotally mounted on the support, an operating cam to engage the lever on one side of its pivot, and a screw located on the opposite side of the pivot from said cam and arranged to oppose its thrust.

16. A support pivotally adjustable and having an eccentric portion, a tool support mounted on said eccentric portion, means for securing said pivotal support against rotation, an arbor mounted in the tool support, a tool secured to the arbor, means for rotating the arbor, and means for operatively supporting work with respect to said tool.

17. A support pivotally adjustable and having an eccentric portion, a driving element mounted on said eccentric portion, a support for a tool mounted on said eccentric portion, means for holding the pivotal support against rotation, an arbor mounted in the tool support, driving means secured to said arbor, connections between said driving element and driving means, a tool secured to said arbor, and means for operatively supporting work with respect to said tool.

18. A frame having plunger sockets in the table thereof and supports projecting from the rear side, a main shaft mounted in the frame, a carrier mounted on said shaft to be driven thereby, a swinging frame mounted in said supports, means for adjusting said frame longitudinally and laterally of the machine frame, a spindle mounted in said swinging frame and bearing a tool located in coöperative relation with the carrier, driving connections between said spindle and a driver mounted on the pivot of said frame, spring seated plungers located in the sockets in the machine frame, a screw projecting through the swinging frame from the front to the back thereof and with its end arranged to receive the thrust of an actuating lever, an actuating lever pivotally mounted in the swinging frame with one end to engage said screw, and means for engaging the opposite end of the lever to operate the swinging frame.

GEORGE E. WITHERELL.
ERNEST R. SEWARD.

Witnesses:
ARTHUR B. JENKINS,
EDWARD J. McGINN.

---

Copies of this patent may be obtained for five cents each, by addressing the "Commissioner of Patents, Washington, D. C."